Feb. 21, 1961 W. L. VERVEST ET AL 2,972,258
SHAFT POSITIONING MECHANISM
Filed Oct. 27, 1954 3 Sheets-Sheet 1

INVENTORS
WILHELMUS LAMBERTUS VERVEST
THEODOOR MARIA ALBERT LIPS
MUNGO LAWRIE DOBBIE
BY
AGENT

Feb. 21, 1961 W. L. VERVEST ET AL 2,972,258
SHAFT POSITIONING MECHANISM
Filed Oct. 27, 1954 3 Sheets-Sheet 2

INVENTORS
WILHELMUS LAMBERTUS VERVEST
THEODOOR MARIA ALBERT LIPS
MUNGO LAWRIE DOBBIE
BY
AGENT

Feb. 21, 1961 W. L. VERVEST ET AL 2,972,258
SHAFT POSITIONING MECHANISM
Filed Oct. 27, 1954 3 Sheets-Sheet 3

INVENTORS
WILHELMUS LAMBERTUS VERVEST
THEODOOR MARIA ALBERT LIPS
MUNGO LAWRIE DOBBIE
BY
AGENT

United States Patent Office 2,972,258
Patented Feb. 21, 1961

2,972,258
SHAFT POSITIONING MECHANISM

Wilhelmus Lambertus Vervest and Theodoor Maria Albert Lips, Hilversum, Netherlands, and Mungo Lawrie Dobbie, Toronto, Ontario, Canada, assignors, by mesne assignments, to North American Philips Company, Inc., New York, N.Y., a corporation of Delaware Filed Oct. 27, 1954, Ser. No. 464,992
Claims priority, application Netherlands Mar. 19, 1954
6 Claims. (Cl. 74—10.2)

It is known to adjust determined positions of rotary shafts with the use of shaft-positioning mechanisms each comprising one selector wheel and a number of pawls with associated pawl rings equal to the number of the positions of the shaft. The said construction is frequently used more particularly for wireless transmitters and wireless receivers which must be capable of being switched over rapidly and accurately from one wavelength to another and it is thus possible to obtain a high accuracy and reproducibility in adjusting the shafts and the tuning means secured thereto. For a detailed description of the positioning mechanism concerned reference is made to the article of W. L. Vervest in "Communication News," vol. X, No. 1, January 1949, pages 20 to 29. In such a device the position of one determined shaft must in certain cases always be dependent upon the position of another shaft, as is the case, for example, when one shaft carries a variable capacitor and the other drives a switch by which a fixed capacitor, a resistor or part of an inductance is switched on or when passing from a determined wavelength range to another. Hitherto this was realised in that each shaft comprised a complete driving mechanism in addition to the parts required for correct adjustment such as a shaft-positioning mechanism with selector wheel, pawls and pawl rings and an overload release clutch. Since the complete drive was required for each shaft, the equipment occupied a space larger than was necessary in proportion to the parts to be driven and furthermore the equipment became expensive and comparatively heavy, which factors play an important part, more particularly, for example, for aircraft equipment.

It has been found that the said disadvantages may be eliminated if a shaft-positioning mechanism for adjusting two rotary shafts adjustable dependently upon one another, of which the main shaft may occupy a determined number of positions adjustable by a shaft-positioning mechanism having one selector wheel and a plurality of pawls and locking discs and an overload release clutch, which positions may be arbitrarily divided over a circle, whereas the other shaft may also occupy a determined number of positions adjustable by a shaft-positioning mechanism having one selector wheel and a plurality of pawls and locking discs and an overload release clutch, which number of positions is a factor of the number of the positions of the main shaft, is of a construction such that there is only one driving mechanism which drives the main shaft, the movement of the selector wheel on the other shaft being derived from the movement of the main shaft, whereas the other shaft is driven by means of the driving mechanism for the main shaft independently of the movement of the main shaft. Consequently, the most important factor is that in the positions chosen the instantaneous position of the selector wheel on the other shaft is determined by the instantaneous position of the main shaft. The said selector wheel only determines which pawl becomes operative; the position itself of the other shaft is of course determined only by the position of the pawl ring co-operating with the pawl chosen.

In one embodiment of the invention, one main shaft and a plurality of other shafts may be provided, the movement of each selector wheel on the other shafts being derived from the movement of the main shaft and the adjustment of each selector wheel being independent of the adjustment of the other selector wheels.

Different paths may be followed to carry out the invention. In one embodiment of the invention, a transmission device provided between the main shaft and the selector wheel of the positioning mechanism on the other shaft is of a construction such that this selector wheel upon adjustment traverses per unit-time an angle of an arc equal to that traversed by the main shaft and that a number of pawls and/or pawl rings regularly divided over 360° and equal to the number of the positions of the other shaft are provided the circumference of the selector wheel of the positioning mechanism on the other shaft exhibiting a depression which extends through an angle of an arc slightly smaller than that between two subsequent pawls. Consequently, if the other shaft requires, for example, only four positions, divided over 360°, four pawls and pawl rings are provided, the angle between two subsequent pawls being 90°, whilst the depression in the selector wheel occupies an angle slightly smaller than 90°. It is thus impossible that two pawls become operative simultaneously. However, in this embodiment of the invention it is necessary that the working ranges of the parts seated on the two shafts shall be equal. If, for example, the main shaft carries a capacitor having a working range of 180° whereas the other shaft has connected to it a switch having a working range of 360°, it is not possible to provide a transmission which ensures that the selector wheel and the main shaft traverse the same angle of an arc per unit-time. It is necessary for the working region of the main shaft to be equal to that of the other shaft. On the other hand, the shaft-positioning mechanisms on the main shaft and on the other shaft need not necessarily be identical.

In another embodiment of the invention, the two shafts carry identical shaft-positioning mechanisms having equal numbers of pawls and pawl rings and the transmission device provided between the main shaft and the selector wheel of the shaft-positioning mechanism on the other shaft is such that the ratio between the angles of an arc traversed per unit-time during adjustment by the main shaft and the selector wheel on the other shaft is equal to the number of pawls, divided by the number of possible positions of the other shaft and multiplied by a whole quotient obtained by dividing 360° by the total working range in degrees, divided over a circle, of the main shaft. In the mechanism according to this embodiment it is thus possible for the shaft-positioning mechanisms on the other shaft or shafts to be made identical with the shaft-positioning mechanism on the main shaft, so that use may be made of parts standardised and manufactured in series.

Furthermore the working regions of the main shaft and the other shaft need not be equal for the use of the above-mentioned embodiment of the invention. However, it is necessary for the working range of the main shaft to be an integer part of that of the other shaft.

However, in another embodiment of the invention, it is alternatively possible to utilise identical shaft-positioning mechanisms on both the other shaft and the main shaft, a transmission device provided between the main shaft and the selector wheel of the positioning mechanism, comprising a Maltese cross such that each time the main shaft has rotated through its working range, expressed in degrees, divided by the number of pawls present in its shaft-positioning mechanism, which working region is a whole factor of 360°, the selector wheel is displaced through an angle equal to 360° divided by the number of desired positions. In this case also it is thus possible that the working range of the main shaft is smaller than that of the other shaft.

In again another embodiment of the invention, a transmission device is preferably provided between the main shaft and the driving means for the selector wheel on the other shaft, which driving means are so designed that the selector wheel on the other shaft is not displaced before the main shaft has reached a position for which different position of the other shaft is required. This embodiment affords the advantages that the selector wheel of the other shaft is not set into motion before it is actually necessary, so that superfluous movements are not performed. In this case also the working regions of the main shaft and the other shaft are different.

In another embodiment of the invention, the selector wheel on the other shaft is driven by the action of a draw spring stretched by the movement of the main shaft, whereas movement of the selector wheel is prevented by a pawl co-operating with a stationary locking disc, in such manner that the co-operation between the pawl and the locking disc is interrupted when the main shaft has reached a position for which a different position of the other shaft is desired the co-operation between the pawl and the locking disc being restored when the new position of the selector wheel is reached. The selector wheel is thus displaced rapidly by the use of a so-called quick break circuit.

In order that the invention may be readily carried into effect, it will now be described with reference, by way of example, to the accompanying drawings, in which.

Figure 6:
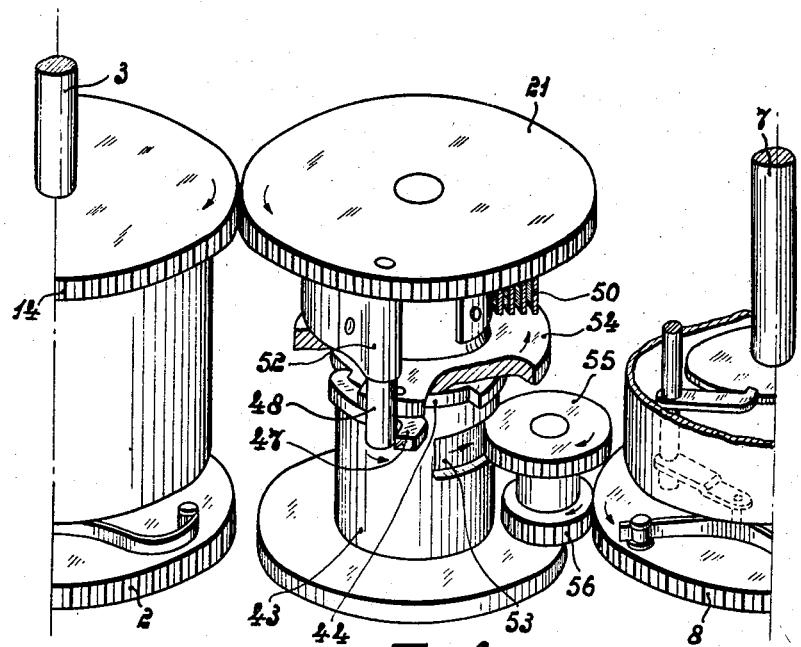
Figure 5:
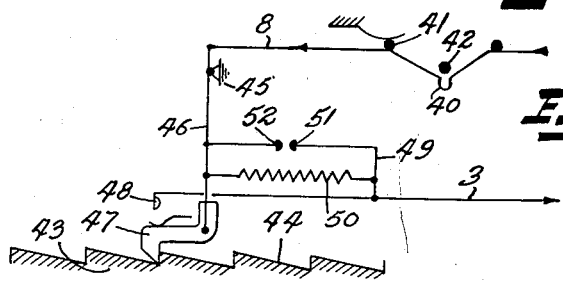

Fig. 5 shows diagrammatically a transmission device in which the two shafts have identical shaft-positioning mechanisms and the other shaft requires only four positions divided over 360° whereas the main shaft has twelve positions divided over 360°, the selector wheel being driven by a spring, and Fig. 6 is a practical embodiment of the diagrammatic view of Fig. 5. All figures are to be regarded as examples.

Figure 7:
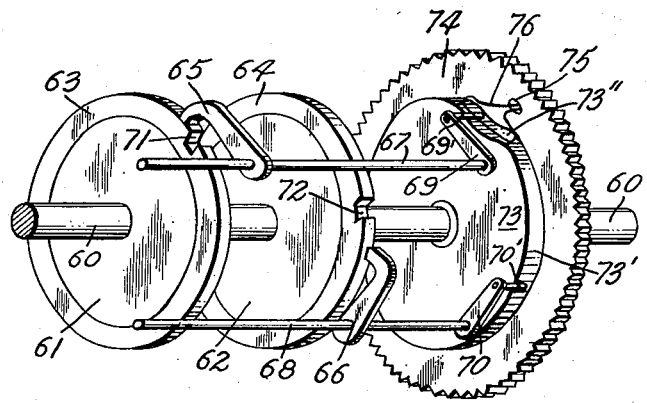

Fig. 7 is a perspective view of a pawl selector arrangement in which the housing is removed and only two pawl and disc assemblies are shown for greater clarity.

In explaining the figures use will be made of the term "loss angle." This is the angle or a determined part of the angle which the main shaft has to traverse in order to move the selector wheel on the other shaft so as to enable the shaft to occupy another position. As this angle is traversed by the main shaft, the other shaft cannot rotate, so that this is lost region. It will be evident that it is necessary to aim at a minimum loss angle.

Figure 1:
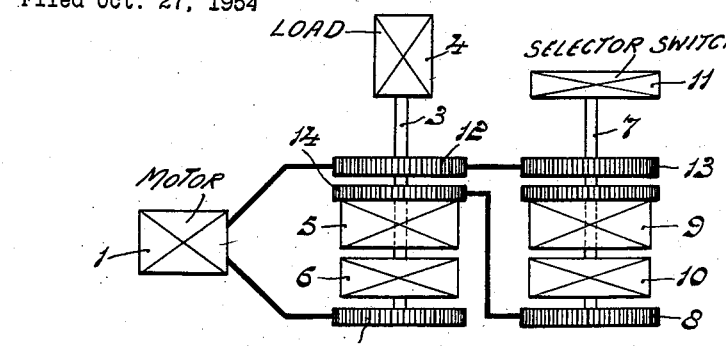
Fig. 1 is a diagrammatic view of the manner in which a main shaft and another shaft are coupled and in which the drive, the shaft-positioning mechanisms and the overload release clutches are shown.

Referring to Fig. 1, a diagrammatic representation of the present invention is shown in which the reference numeral 1 indicates an electric motor that drives through a driving mechanism (not shown in Fig. 1) a selector wheel 2 of an adjustable main shaft 3. The main shaft 3 also couples the load 4 to the selector wheel 2. The load 4 may be, for example, a variable capacitor. The motor 1, in addition, drives the input 12 of an overload release clutch 5. The main shaft 3 is connected to the shaft positioning mechanism by which the various positions of main shaft 3 are determined. Another shaft 7 is connected to selector wheel 8, an overload release clutch 9 and a shaft positioning mechanism 10. The shaft 7 also drives a selector switch 11 by which fixed capacitors, resistors or inductances may be switched into or out of the circuit. The input 13 of the overload release clutch 9 is driven directly by the motor 1 or through a transmission device (not shown in Fig. 1) by the input 12 of the overload release clutch 5. The selector wheel 8 is driven by the main shaft 3 and for this purpose a transmission device (not shown in Fig. 1) is provided between the selector wheel 8 and the output 14 of the overload release clutch which is rigidly secured on the shaft 3. The shaft 7 is locked in a selected position by the pawls 24 and associated pawl rings which form part of the shaft positioning mechanism 10 shown in more detail at the extreme right of Fig. 2. However, a desired pawl can be made operative only, if selector wheel 8 has reached a preselected, predetermined position chosen by the movement of shaft 3. Thus, only one driving mechanism including the electric motor 1 is necessary for operating the present shaft positioning mechanism. It should be noted that the setting selection is made by means of selector wheels 2 and 8 and that the shaft positioning mechanisms 6 and 10 respectively, working through overload clutches 5 and 9 respectively, operate the load 4 and selector switch 11. The pawls 24 and associated pawl rings function to arrest the shafts in the preselected position. The pawls 24 and associated pawl rings are part of shaft positioning device 10 and are clearly shown in Figs. 2, 3, 4 and 6. Accordingly, a compact, relatively light weight arrangement has been constructed in accordance with the present invention in which one driving mechanism operates both shafts, and the movement of the other shaft is derived from the movement of the main shaft and independently of the movement of the latter.

Figure 2:
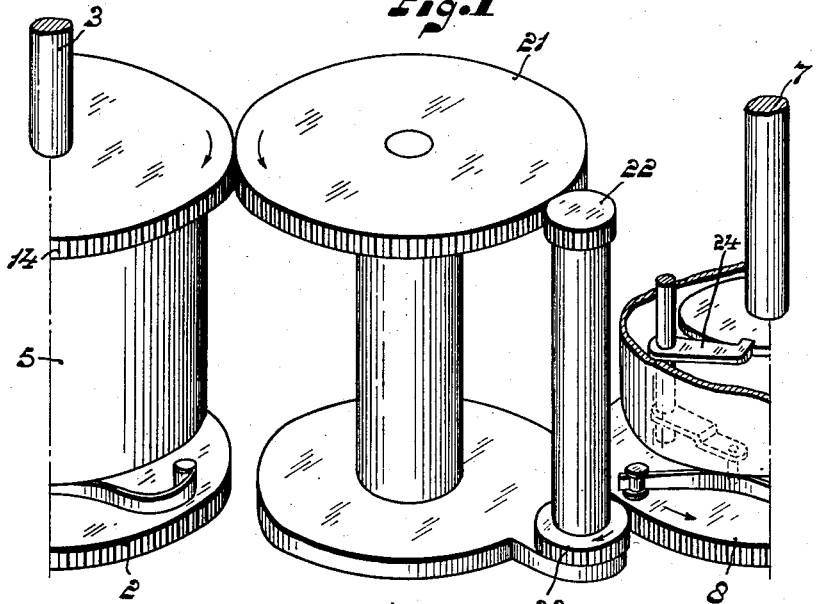
Fig. 2 shows how the transmission may be, if the main shaft has twelve positions arbitrarily divided over 360° whereas the other shaft requires four positions likewise divided arbitrarily over 360°.
Figure 2A:
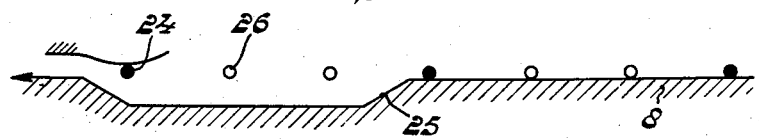
Fig. 2a shows a detail of the selector wheel of Fig. 2 on the other shaft for four positions.
Figure 2B:
Fig. 2b shows a detail of the same selector wheel now for six positions.

In Fig. 2 a transmission device is shown in which reference numeral 14 indicates the gear wheel which is rigidly secured to the main shaft 3. The gear wheel 14 drives a gear wheel 21, with which a small gear wheel 22 co-operates. The latter is rigidly connected to a gear wheel 23 which in turn co-operates with a selector wheel 8. Furthermore, a selector wheel 2 is provided. Selector wheel 2 thus is the pawl selector for the shaft 3; gear wheel 14 is the output of the overload release clutch 5 and drives via gear wheels 21, 22 and 23 the selector wheel 8. Assuming that the shaft 3 requires twelve positions arbitrarily divided over 360° whereas the shaft 7 requires four positions, also divided over 360°, the positioning mechanism for shaft 3 thus comprises twelve pawls regularly divided over 360° and the selector wheel 2 also has twelve positions regularly divided over 360°. However, the mechanism determining the positions of shaft 7 comprises only four pawls 24, regularly divided over 360°, and the selector wheel 8, as shown in Fig. 2a, exhibits a depression 25 extending through an angle of an arc slightly smaller than 90°, so that only one pawl may be chosen by the selector wheel at a time. In Fig. 2a, the pawls 24 which determine the positions of shaft 7 are indicated as dots whereas the pawls 26 indicated by small circles are not present but would have to be present if the shaft 7 also required twelve positions. In Fig. 2b, the selector wheel 8 exhibits a depression which extends only through a little less than 60°. This selector wheel which co-operates with six pawls thus renders possible six positions of the shaft 7, divided over 360°. It will be evident that the number of the positions of shaft 7 must always be a factor of the number of the positions of shaft 3. For twelve positions of shaft 3 (the number most used in practice) shaft 7 can thus have only two, three, four, six or twelve positions.

The described construction affords the advantage of simplicity. However, it has the disadvantage that the loss angle is large and that the springs of the overload release clutch 5 of the main shaft 3 have to drive the whole mechanism on the other shaft 7, so that the springs must be stronger than would be necessary for locking the shaft 3.

Figure 3:
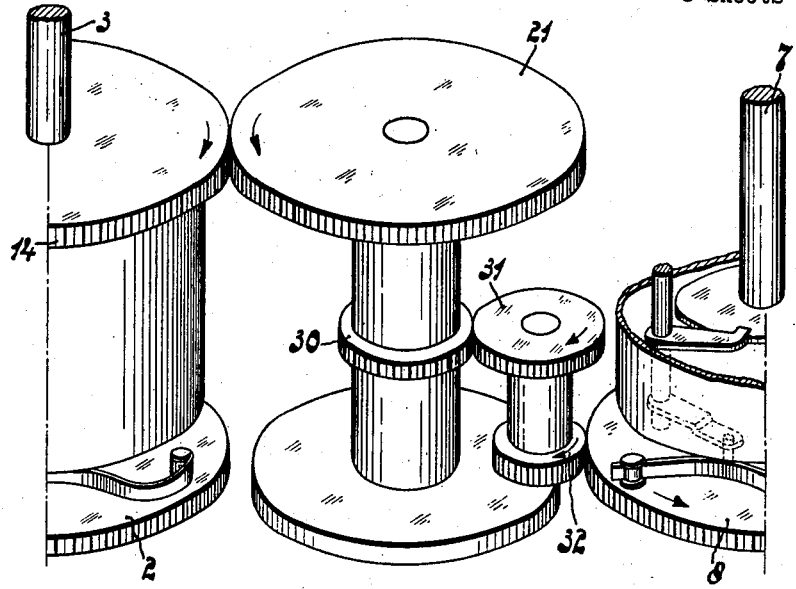
Fig. 3 shows a transmission device between the main shaft and the selector wheel on the other shaft, the two shafts comprising identical shaft-positioning mechanisms and requiring, as before, twelve and four positions respectively.

Fig. 3 shows a reducing transmission device between the gear wheel 14 and the selector wheel 8. In this figure the gear wheel 14 (the output of the overload release clutch 5), which is rigidly connected to the shaft 3, drives the gear wheel 21 and connected to the latter is a gear wheel 30 which co-operates with a gear wheel 31 of same size. The latter is rigidly connected to a smaller gear wheel 32 which in turn drives selector wheel 8. The two shafts 3 and 7 have identical shaft-positioning mechanisms so that both may have, for example, twelve locked positions. However, since the transmission device is reducing, use may be made of only part of the number of possible positions of shaft 7. This part, multiplied by the transmission ratio, must indicate the total number of possible positions, it being evident that the number of positions must be a whole number and a factor of the number of the positions of the main shaft. If, for example, the shaft 7 requires four positions and the total number of pawls and hence possible positions is twelve, the transmission ratio is 3:1. With each complete revolution of the shaft 3, use is thus made of four adjacent pawls of shaft 7 and these extend through an angle of an arc of 120°. With a subsequent complete revolution of the shaft 3, the subsequent four pawls are used, but these block the shaft 7 in the same positions as the first four pawls. This is always possible, of course, by the adjustment of the pawl rings. The third four pawls are used in a similar manner. The described construction affords the advantage that, in addition to being simple, the springs of the overload release clutch on the main shaft are loaded to a less extent than the springs in the construction of Fig. 2. However, the loss angle becomes larger than in the construction of Fig. 2. The working range of shaft 3 may be smaller than that of shaft 7.

Figure 4:
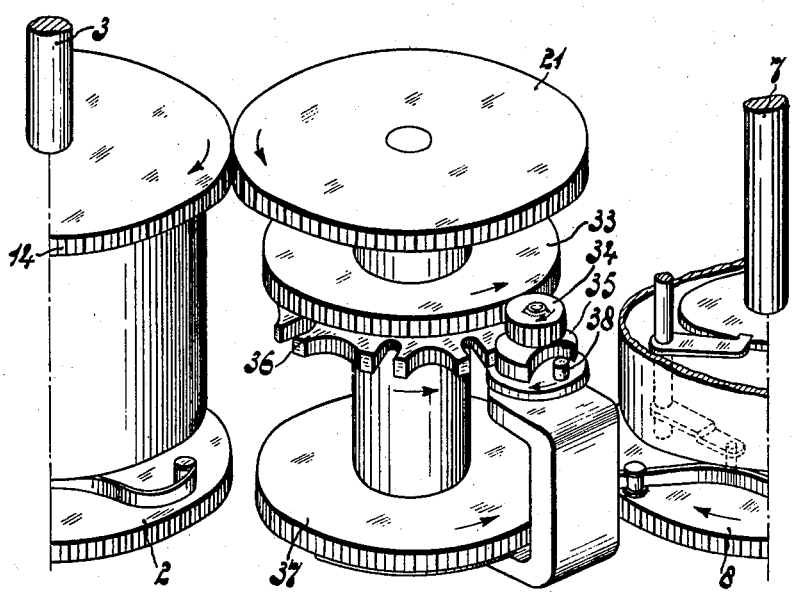
Fig. 4 shows a similar transmission device including a Maltese cross to fulfill the same requirements as in Fig. 3.

In Fig. 4 a Maltese cross or Geneva gear is used in the transmission device. The gear wheel 21 drives a gear wheel 33 which in turn drives a small gear wheel 34. The latter has connected to it a locking wheel 35 of a Maltese cross, of which the cross itself (36) is rigidly connected to a gear wheel 37. The locking wheel 35 also comprises a pin 38, which brings about rotation of the cross 36 on being released by the locking wheel 35. When the two shaft-positioning mechanisms, as before, permit twelve possible positions whereas the shaft 7, as before, requires four positions, the cross requires a number of teeth such that this number in combination with the transmission device between the gear wheels 33 and 34 always brings about a rotation of 30° of the selector wheel 8. Furthermore, the transmission ratio between the gear wheels 33 and 34 must, as before, satisfy the condition that twelve, divided by the number of the positions of the switch, is equal to this transmission, which thus is an acceleration and has the value 3:1. In this construction the loss angle is smaller than those in the constructions of Figs. 2 and 3, but this is offset by the fact that the springs in the overload release clutch of the main shaft have to take along the assembly and that a Maltese cross is an expensive construction. However, if a comparatively small loss angle is much appreciated, the construction of Fig. 4 is preferable to those of Figs. 2 and 3.

The construction shown in Fig. 6 will now be explained with reference to the diagram shown in Fig. 5.

Assuming, as before, that the two shaft-positioning mechanisms permit twelve positions, that all pawls on the other shaft 7 are used and that this other shaft, as before, requires four positions. From this it follows that the selector wheel 8, as before, must be turned by 30° to pass from one position to another. In Fig. 5, in which all rotations are shown as rectilinear movements for the sake of clearness the selector wheel 8, which exhibits a depression 40, must be moved to the left. 41 and 42 indicate two out of the twelve pawls, pawl 42 being shown in function. The main shaft 3 moves to the right. Furthermore a stationary body 43 having teeth 44 and a fixed centre of rotation 45 is present. A rod 46 can rotate about this centre of rotation. The part of the rod connected to the selector wheel 8 has a length, as reckoned from the selector wheel to the centre of rotation, which is exactly ⅓ of the length of the part of the rod, as measured from the centre of rotation 45 to the other end, where a pawl 47 is rotatably connected to the rod 46. If the stationary body 43 is circular in shape, each tooth 44 thereof extends through an angle of an arc of 90°. An abutment 48 is secured to the main shaft 3. The shaft 3 also exhibits a rod 49 having connected to it a spring 50, the other end of which is connected to the rod 46. The same rod 49 exhibits an abutment 57 which can co-operate with an abutment 52 on the rod 46.

The assembly operates as follows: When the rod 3 (which actually is the main shaft) moves to the right, the spring 50 is stretched, since the rod 46 cannot move with the pawl 47, the latter being checked by the tooth 44. As soon as the abutment 48 engages the pawl 47, the latter is lifted and the rod 46 can rotate about the point 45. The selector wheel 8 is thus driven, but through an angle of 30° only, as reckoned along its circumference, since the rod 46 brings about a transmission of 3:1 and the pawl 47 is locked by the subsequent tooth which is 90° remote from the first tooth. Due to the movement of selector wheel 8, pawl 42 has been lifted and pawl 41 has now become operative. It will be evident that a different division of the number of teeth on the stationary body 44 requires a different ratio of the lengths of the parts of rod 46 for rotating the selector wheel each time by 30°, which in itself is only necessary in view of the twelve pawls. One of the advantages of the construction of Fig. 5 is that the separate spring 50 brings about the rotation of selector wheel 8, so that the springs in the overload release clutch of the main shaft have to perform only little work which is much less than in the constructions shown in Figs. 3 and 4. The loss angle is reduced substantially to zero as a result of the small distance to be covered by the shaft 3 from the moment when the abutment 48 engages the pawl 47 for lifting it.

Fig. 6 shows in what manner the diagrammatic construction of Fig. 5 may be realised. The movement of the main shaft 3, as before, is transferred to the gear wheel 21 via the output 14 of the overload release clutch which is rigidly secured to the main shaft 3. A pin 52 carried by the gear wheel 21 has connected to it one extremity of spring 50. The lower part of pin 52 is the abutment 48. A small gear wheel 53 which is rigidly connected to a carrier 54 is provided at the interior of the stationary body 43 having teeth 44. The carrier 54, which is rotatably arranged, has connected to it the other extremity of spring 50 and also carries the pawl 47.

The small gear wheel 53 co-operates with a small gear wheel 55. The latter upon rotation drives a small gear wheel 56 which sets selector wheel 8 into rotation. The gear wheels 53, 55 and 56 have the same functions as rod 46.

The operation with reference to Fig. 5 is evident. The gear wheel 21 is driven by the movement of wheel 14 (the main shaft). The spring is stretched by the upper end of pin 52 until the lower end 48 of the pin engages the pawl 47 and disengages it from the teeth 44. Now, the spring 50 relaxes and drives body 54 and gear wheel 53, thus displacing selector wheel 8. In the case under consideration the transmission mechanism 53, 55, 56, 8 has a reduction of 3:1, since the shaft 3 has twelve positions, divided over 360°, whereas shaft 7 requires only four positions, divided over 360°. If the working region of shaft 3 would be 180° or 120° instead of 360° with a working region of 360° of shaft 7, a different choice of the transmission, if desired coupled with a different number of teeth 44, always permits of obtaining the desired action whilst retaining a minimum loss angle and a small load on the springs in the overload release clutch of the main shaft.

Figure 7 represents a shaft 60 which is adapted to be arrested in several positions. Of the arresting elements on the shaft 60 to be arrested and the pawl-carrying shafts arranged about this shaft only two are represented. Each such arresting element comprises a disc 61 or 62 provided on the shaft 60 and carrying a ring 63 or 64, respectively, of which the edge has a recess 71 or 72, respectively. In this case also the discs and rings are mechanically mounted on the shaft 60 by axial compressive force.

The selecting member 74 rotatable on the shaft 60 has an elevation 73 which extends in an axial direction and of which the surface 73' extending around the shaft 60 constitutes the guide surface for the pins 69' or 70' secured to the ends of the arms 69 or 70, respectively, with which each of the pawl-carrying shafts 67 or 68 arranged around the shaft 60 is furnished. The surface 73' extends approximately circularly around the shaft 60 but has a limited depression 73". All pawls of which the pins of the associated arms rest on the circular part 73' of this surface of the selecting member 74, are lifted in a constrained manner, and only that pawl of which the pin is located in or above the depression 73" of the surface 73' is adapted to co-operate with an arresting element 61 or 62 about the shaft 60. In Figure 7 the pin 69' of the arm 69 is urged towards the shaft 60 by spring 76 and the interruption 73" of the circular form of the surface 73' is located below this pin. As a result thereof the shaft 67 is rotated until the pawl 65 on this shaft co-operates with the outer surface of the ring 63 with the result that upon rotation of the shaft 60 this pawl arrests the shaft 60 by engaging the recess 71. The spring 76 consists of a doubly bent wire, of which the ends are fastened in the aperture 75 provided in the selecting member 74 above the depression 73" of the surface 73'. The central part of this wire 76 extends substantially tangentially and exerts a pressure, in the direction of the shaft, on the particular pin which is caused to be located above the depression 73" of the surface 73'.

The pin 70' of the arm 70 secured to the shaft 68 to which the pawl 66 is fixed rests on the circular surface 73'. Consequently the pawl 66 is lifted and is maintained with its end at some distance from the outer surface of ring 64. Rotation of the selecting member 74, out of the represented selecting position results in that the shaft 67 is rotated, since the rising part of the surface 73' moves under the pin 69' on the arm 69 with the result that the pawl 65' is lifted. Consequently, the pawl 65 in question is lifted in a constrained manner and so remains until the selecting member 74 occupies again the selecting position in which this pawl 65 is made to co-operate with the ring 63.

What is claimed is:

1. A shaft-positioning mechanism comprising a main rotary shaft, a second rotary shaft, means for adjusting said main and secondary rotary shafts dependent upon one another whereby said main and secondary shafts alternately occupy a predetermined number of positions, comprising; at least one selector wheel on said secondary shaft, a plurality of pawls, a plurality of locking discs and an overload release clutch on both said main and secondary rotary shafts; a transmission device, the number of positions of the secondary shaft being a factor of the number of positions on the main shaft and effected through said transmission device; driving means for said main shaft; a plurality of gear wheels, the selector wheel on said secondary shaft being operatively connected to said driving means through said gear wheels; and said secondary shaft being driven by said driving means independently of the movement of said main shaft.

2. A shaft-positioning mechanism as set forth in claim 1 wherein said transmission device is located between said main shaft and the selector wheel of said secondary shaft, the selector wheel of said secondary shaft traversing per unit of time an angle of an arc equal to that traversed by said main shaft, the number of pawls being equally divided over 360° corresponding to the number of positions of said main shaft, the circumference of the selector wheel on the secondary shaft having a depression extending at an angle of an arc which is smaller than the angle between two pawls.

3. A shaft-positioning mechanism as set forth in claim 1 wherein the elements on said secondary shaft are identical with the elements on said main shaft, said transmission device being located between said main shaft and the selector wheel on said secondary shaft whereby the ratio between the angles of an arc traversed per unit of time during adjustment by the main shaft and the selector wheel on the other shaft is equal to the number of pawls divided by the number of required positions of said secondary shaft and multiplied by a whole quotient obtained by dividing 360° by the total working range of the main shaft in degrees over a circle.

4. A shaft-positioning mechanism as set forth in claim 1 wherein the elements on said secondary shaft are identical with the elements on said main shaft, said transmission device being located between said main shaft and the selector wheel on said secondary shaft including a Geneva gear and a locking disc co-acting therewith whereby each time said main shaft turns through its working range expressed in degrees divided by the number of pawls present in the positioning mechanism of said main shaft, said working range being a whole factor of 360°, the selector wheel on said secondary shaft is displaced through an angle equal to 360° divided by the number of desired positions of said selector wheel.

5. A shaft-positioning mechanism as set forth in claim 1 wherein said transmission device is provided between said main shaft and the driving means for said selector wheel on said secondary shaft, said selector wheel on said secondary shaft being displaced only when the main shaft has reached a position for which a different position of said secondary shaft is necessary.

6. A shaft-positioning mechanism as set forth in claim 5 further comprising a spring, a locking disc and at least one pawl co-acting therewith wherein the selector wheel on said secondary shaft is displaced by said spring which is stressed by the movement of said main shaft, movement of the selector wheel on said secondary shaft being prevented by said pawl co-acting with said locking disc in such a manner that the co-action between the pawl and the locking disc is interrupted when the main shaft reaches a position for which a new position of the secondary shaft is necessary, the co-action between said pawl and said locking disc being restored when the new position of the selector wheel of said secondary shaft is reached.

References Cited in the file of this patent

UNITED STATES PATENTS

| | | |
|---|---|---|
| 2,493,635 | McKellip | Jan. 3, 1950 |
| 2,530,795 | Unk | Nov. 21, 1950 |
| 2,616,299 | Unk et al. | Nov. 4, 1952 |
| 2,770,136 | Vervest et al. | Nov. 13, 1956 |
| 2,837,925 | Rowley et al. | June 10, 1958 |